(12) United States Patent
Kim

(10) Patent No.: US 9,371,086 B2
(45) Date of Patent: Jun. 21, 2016

(54) STEERING COLUMN FOR VEHICLE AND STEERING APPARATUS HAVING THE SAME

(71) Applicant: MANDO CORPORATION, Pyeongtaek-si, Gyeonggi-do (KR)

(72) Inventor: Jong Han Kim, Incheon (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/589,627

(22) Filed: Jan. 5, 2015

(65) Prior Publication Data

US 2015/0114166 A1 Apr. 30, 2015

Related U.S. Application Data

(62) Division of application No. 13/607,484, filed on Sep. 7, 2012, now abandoned.

(30) Foreign Application Priority Data

Sep. 7, 2011 (KR) ......................... 10-2011-0090487

(51) Int. Cl.
*B62D 1/184* (2006.01)
*B62D 1/16* (2006.01)
*B62D 1/189* (2006.01)

(52) U.S. Cl.
CPC *B62D 1/16* (2013.01); *B62D 1/184* (2013.01); *B62D 1/189* (2013.01)

(58) Field of Classification Search
CPC ........ B62D 1/184; B62D 1/185; B62D 1/187; B62D 1/189; B62D 1/18; B62D 1/16
USPC .............................. 280/775, 779; 74/493, 492
See application file for complete search history.

(56) References Cited

U.S. PATENT DOCUMENTS

| | | | |
|---|---|---|---|
| 6,467,807 B2 | 10/2002 | Ikeda et al. | |
| 7,726,691 B2 | 6/2010 | Yamada | |
| 8,505,407 B2 | 8/2013 | Nomura et al. | |
| 2005/0093283 A1 | 5/2005 | Yamada | |
| 2011/0005346 A1* | 1/2011 | Kwon ................... | B62D 1/184 74/493 |
| 2011/0204610 A1 | 8/2011 | Kwon | |

FOREIGN PATENT DOCUMENTS

| | | |
|---|---|---|
| CN | 102161346 A | 8/2011 |
| JP | 2008-174105 A | 7/2008 |
| JP | 2009-006847 A | 1/2009 |

OTHER PUBLICATIONS

U.S. non-final Office Action issued in U.S. Appl. No. 13/607,484, dated Oct. 9, 2014.

* cited by examiner

*Primary Examiner* — Keith Frisby
(74) *Attorney, Agent, or Firm* — McDermott Will & Emery LLP

(57) ABSTRACT

The present invention relates to a steering column for a vehicle and a steering apparatus having the same. According to the present invention, it is possible to prevent loads transmitted to the steering column from being concentrated to a part of the steering column, to uniformize the distribution of operation force of the adjusting lever, and to prevent the deformation and damage of the steering column when the driver operates the steering wheel by maintaining the bearing forces of the upper tube and the lower tube at the time of tightening and releasing the adjusting lever for a tilt or telescope operation while increasing the rigidity of the entirety of the steering column.

3 Claims, 5 Drawing Sheets

STEERING COLUMN FOR VEHICLE AND STEERING APPARATUS HAVING THE SAME

CROSS-REFERENCE TO RELATED APPLICATION

This application is a Divisional of U.S. application Ser. No. 13/607,484, filed on Sep. 7, 2012, which claims priority from and the benefit under 35 U.S.C. 119(a) of Korean Patent Application No. 10-2011-0090487, filed on Sep. 7, 2011, which are hereby incorporated by reference for all purposes as if fully set forth herein.

BACKGROUND OF THE INVENTION

1. Field of the Invention

The present invention relates to a steering column for a vehicle. In more particular, the present invention relates to a steering column for a vehicle which is configured to prevent loads transmitted to the steering column from being concentrated to a part of the steering column, to uniformize the distribution of operation force of an adjusting lever, and to increase the rigidity of the entirety of the steering column while maintaining the bearing forces of an upper tube and a lower tube at the time of tightening and releasing the adjusting lever for a tilt or telescope operation, so that the steering column can be prevented from being deformed or damaged when a driver operates a steering wheel. The present invention also relates to a steering apparatus for a vehicle having the above-mentioned steering column.

2. Description of the Prior Art

As generally known in the art, a steering column for a vehicle is an apparatus that is formed to enclose a steering shaft for transmitting a torque produced when a driver rotates a steering wheel to a rack-and-pinion mechanism so as to support the rotation of the steering shaft, in which the steering column is coupled to the vehicle body through a bracket so as to fix the position of the steering shaft.

Such a steering column may be additionally provided with a telescope or tilt function, in which a tilt apparatus is an apparatus for adjusting the fixing angle of the steering wheel, and a telescope apparatus is formed by fitting two hollow tubes into one another to be axially extendible/retractable so that the steering shaft and the steering column can be collapsed to absorb an impact energy in a vehicle crash.

Accordingly, steering apparatuses may be classified into a telescope type steering apparatus and a tilt type steering apparatus depending on the functions thereof. Occasionally, the tilt function may be added to the telescope type steering apparatus, so that a driver is allowed to adjust the degree of extension or tilt angle of the steering wheel to be suitable for his/her height or body type through the tilt function so as to smoothly conduct the steering operation.

FIG. 1 is an exploded perspective view illustrating a part of a conventional steering column for a vehicle.

As illustrated in FIG. 1, the conventional steering column for a vehicle includes: an upper tube 100 configured to accommodate a steering shaft 175; a lower tube 170 fitted in the upper tube 100; a lower mounting bracket 165 for fixing the lower tube 170 to a vehicle body; an upper mounting bracket 105 installed on the top side of the upper tube 100 and fixed to the vehicle body; a distance bracket 180 fixed integrally with the upper tube 100 and formed with a telescope slot 185; a tilt bracket 150 formed integrally with the upper mounting bracket 105, and formed with an elongated tilt slot 110; a stationary gear 145 formed on the outer surface of the tilt bracket 150; a movable gear 140 configured to be engaged with or disengaged from the stationary gear 145; a tilt bolt 130 extending through the tilt slot 110; a cam 135 coupled to the movable gear 140; a washer 125 and a nut 120 configured to fix the cam 135 and an adjusting lever 115; and a gear spring 142 positioned between the movable gear 140 and the stationary gear 145.

Both the tilt and telescope operations are applied by tightening or releasing the adjusting lever 115. When the adjusting lever 115 is tightened, the tilt bracket 150 is narrowed to apply a compressive force to the upper tube 100, so that the upper tube 100 and the lower tube 170 can be tightly contacted with each other to disenable the tilt and telescope operations. To the contrary, when the adjusting lever 115 is released, the compressive force disappears from the upper tube 100 and the lower tube 170 to enable the tilt and telescope operations.

The telescope operation is completed by releasing the adjusting lever 115, then changing the position of the tilt bolt 130 along the telescope slot 185 formed in the distance bracket 180, and then tightening the adjusting lever 115.

The tilt operation is completed by releasing the adjusting lever 115, then changing the tilt bolt 130 along the tilt slot 110, and then tightening the adjusting lever 115.

In the state in which the adjusting lever 115 is locked, the upper tube 100 and the steering shaft 175 are fixed. When the adjusting lever 115 is released, the upper tube 100 and the lower tube 170 may be tilted in relation to a tilt center 160 or the steering column may be extended or retracted axially by the cam 135.

Such a conventional steering column for a vehicle has a problem in that a column bearing force and rigidity of the column itself are poor since loads are concentrated to the tilt bracket and the distance bracket that tighten the steering column with the tilt bolt and the adjusting lever.

Specifically, there are problems in that since a connection part between the upper tube and the tilt bracket fixed to the vehicle body through the upper mounting bracket is fragile, the rigidity of the column itself is reduced as compared to the column bearing force so that the steering column may be deformed or damaged by a torsional load produced when the driver operates the steering wheel, and a substantial bending may occur in a vehicle crash.

SUMMARY OF THE INVENTION

Accordingly, the present invention has been made to solve the above-mentioned problems occurring in the prior art, and an aspect of the present invention is to provide a steering column for a vehicle which is configured to prevent loads transmitted to the steering column from being concentrated to a part of the steering column, to uniformize the distribution of operation force of an adjusting lever, and to increase the rigidity of the entirety of the steering column while maintaining the bearing forces of an upper tube and a lower tube at the time of tightening and releasing the adjusting lever for a tilt or telescope operation, so that the steering column can be prevented from being deformed or damaged when a driver operates a steering wheel.

In accordance with an aspect of the present invention, there is provided a steering column for a vehicle including: a hollow lower tube configured to enclose a steering shaft; and an upper tube fitted on the outer periphery of the lower tube, wherein the upper tube is formed with a first slot that is slit axially, a second slot that is slit circumferentially at the lower end of the first slot, supporting parts protruding from the outer periphery of the upper tube at the upper side of the second slot to be diametrically opposed to each other, and one or more stress dispersion parts formed on the outer periphery of the upper tube at the axially upper side of the supporting parts to disperse stresses.

In accordance with another aspect of the present invention, there is provided a steering apparatus for a vehicle including: a steering shaft connected to a steering wheel; and a steering column coupled to the steering shaft and assembled to a vehicle body, wherein the steering column includes: a hollow lower tube configured to enclose a steering shaft; and an upper tube fitted on the outer periphery of the lower tube, wherein the upper tube is formed with a first slot that is slit axially, a second slot that is slit circumferentially at the lower end of the first slot, supporting parts protruding from the outer periphery of the upper tube at the upper side of the second slot to be diametrically opposed to each other, and one or more stress dispersion part formed on the outer periphery of the upper tube at the axially upper side of the supporting parts to disperse stresses.

According to the present invention, it is possible to prevent loads transmitted to the steering column from being concentrated to a part of the steering column, to uniformize the distribution of operation force of the adjusting lever, and to increase the rigidity of the entirety of the steering column while maintaining the bearing forces of the upper tube and the lower tube at the time of tightening and releasing the adjusting lever for a tilt or telescope operation, so that the steering column can be prevented from being deformed or damaged when a driver operates a steering wheel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
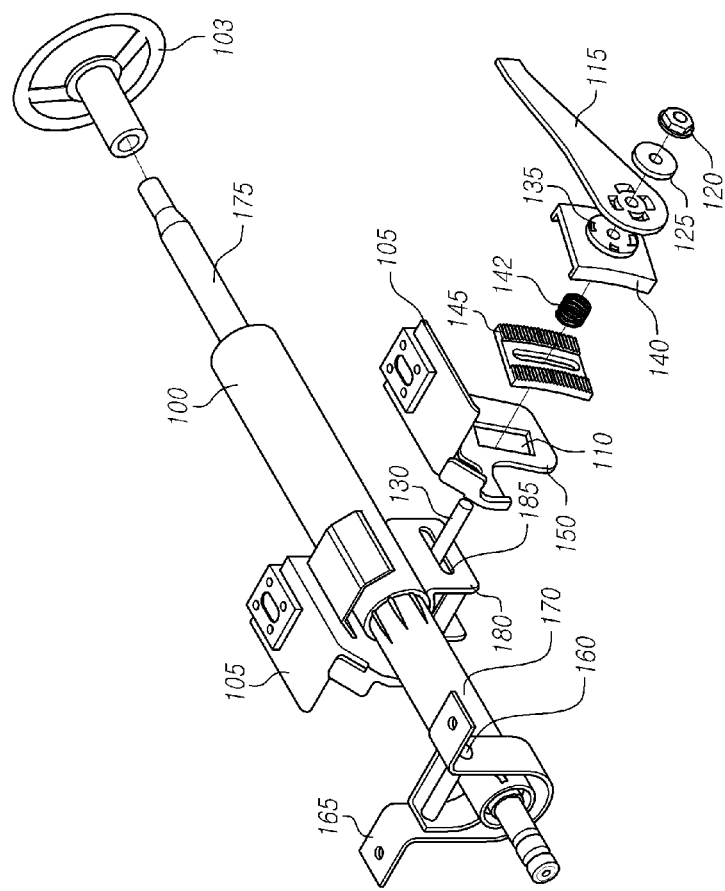
FIG. 1 is an exploded perspective view illustrating a part of a conventional steering column for a vehicle.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
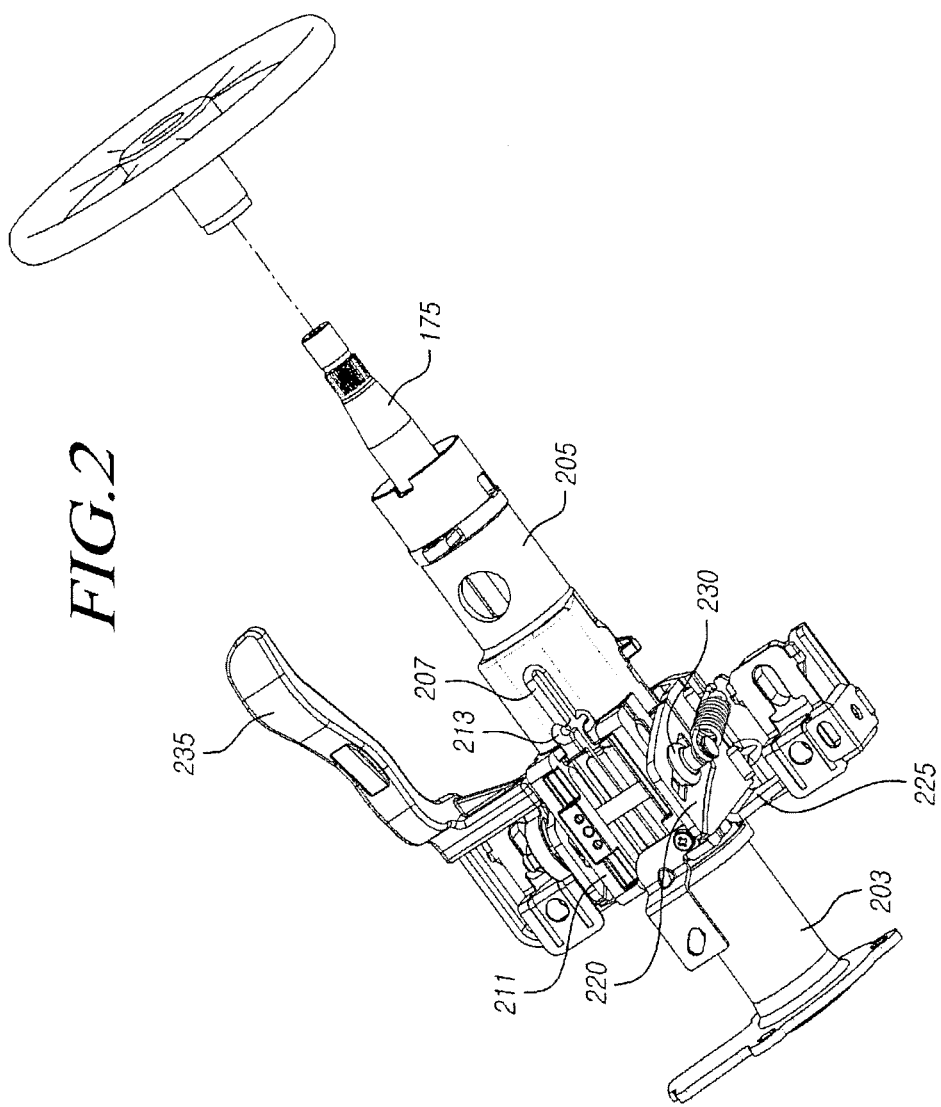
FIG. 2 is a perspective view illustrating a steering column for a vehicle in accordance with an exemplary embodiment of the present invention.
Figure 3:
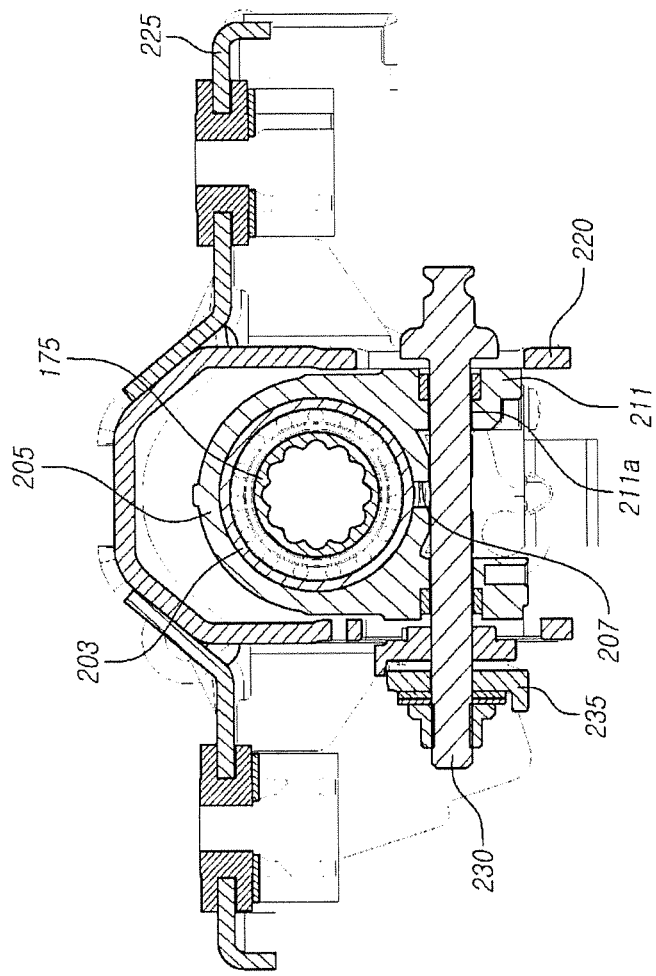
FIG. 3 is a cross-sectional view of the steering column of FIG. 2.
Figure 4:
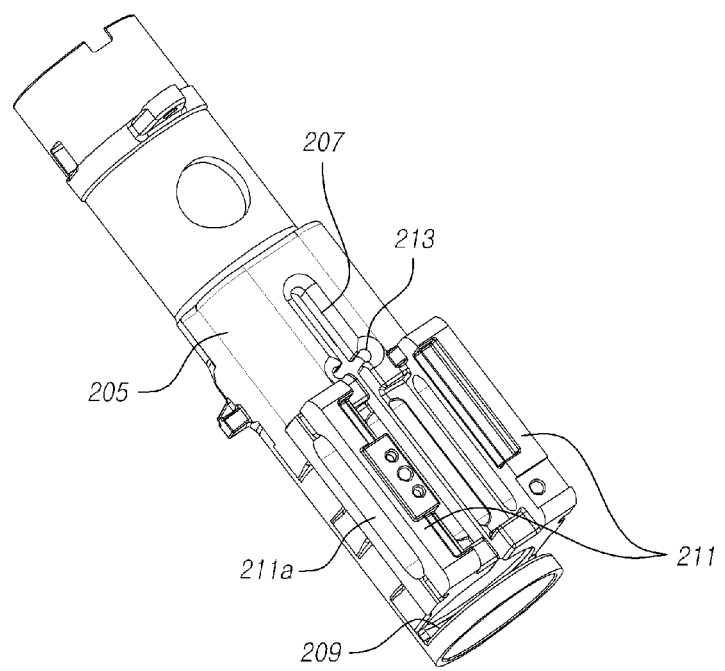
FIG. 4 is a perspective view illustrating the upper tube of FIG. 2.
Figure 5:
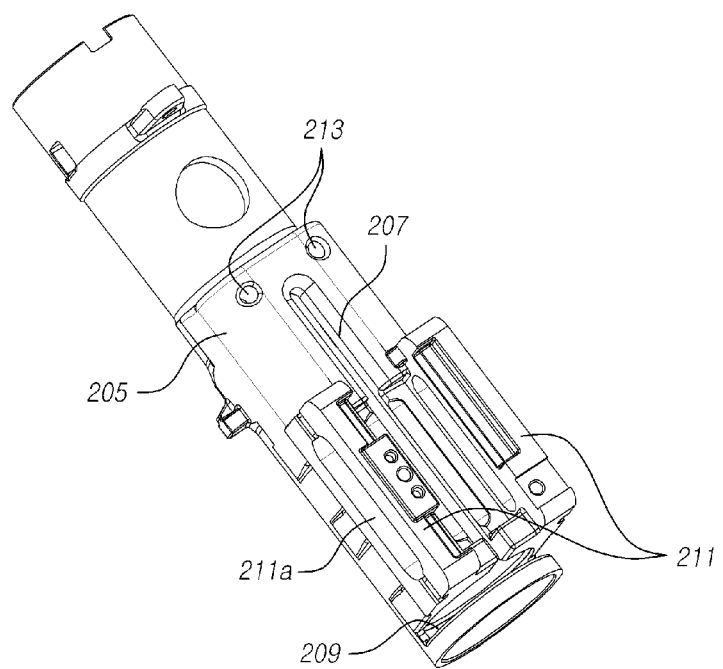
FIG. 5 is a perspective view illustrating another exemplary embodiment of the upper tube in the steering column of the exemplary embodiment of the present invention.

FIG. 2 is a perspective view illustrating a steering column for a vehicle in accordance with an exemplary embodiment of the present invention, FIG. 3 is a cross-sectional view of the steering column of FIG. 2, FIG. 4 is a perspective view illustrating the upper tube of FIG. 2, and FIG. 5 is a perspective view illustrating another exemplary embodiment of the upper tube in the steering column of the exemplary embodiment of the present invention.

As illustrated in these drawings, a steering column 200 for a vehicle in accordance with an exemplary embodiment of the present invention includes: a hollow lower tube 203 configured to enclose a steering shaft 175; and an upper tube 205 fitted on the outer periphery of the lower tube 203, wherein the upper tube 205 is formed with a first slot 207 that is slit axially, a second slot 209 that is slit circumferentially at the lower end of the first slot 207, supporting parts 211 protruding from the outer periphery of the upper tube 205 at the upper side of the second slot 209 to be diametrically opposed to each other, and one or more stress dispersion parts 213 formed on the outer periphery of the upper tube 205 at the axially upper side of the supporting parts 211 to disperse stresses.

In addition, a steering apparatus for a vehicle in accordance with another exemplary embodiment of the present invention includes: a steering shaft 175 connected to a steering wheel; and a steering column 200 coupled to the steering shaft 175 and assembled to a vehicle body, wherein the steering column 200 includes: a hollow lower tube 203 configured to enclose a steering shaft 175; and an upper tube 205 fitted on the outer periphery of the lower tube 203, the upper tube 205 being formed with a first slot 207 that is slit axially, a second slot 209 that is slit circumferentially at the lower end of the first slot 207, supporting parts 211 protruding from the outer periphery of the upper tube 205 at the upper side of the second slot 209 to be diametrically opposed to each other, and one or more stress dispersion parts 213 formed on the outer periphery of the upper tube 205 at the axially upper side of the supporting parts 211 to disperse stresses.

The steering column 200 of a vehicle in accordance with the exemplary embodiment of the present invention is configured such that the upper tube 205 is fitted on the outer periphery of the lower tube 203, and each of the supporting parts 211 on the upper tube 205 is formed with a telescope operation hole 211a for a telescope operation, and a tilt bolt 230 is coupled to the telescope operation holes 211a. When the adjusting lever 235 is tightened or released, the supporting parts 211 of the upper tube 205 are contracted or relaxed in the diametrical direction perpendicular to the steering shaft 175 to compress or release the lower tube 203 so that the tilt or telescope function can be implemented.

The lower tube 203 has a hollow shape to enclose the steering shaft 175 and is fixed to the vehicle body via a lower mounting bracket (see reference numeral 165 in FIG. 1). At the time of implementing the tilt function, the lower tube 203 is rotated about a hinge axle (see reference numeral 160 in FIG. 1) provided in the lower mounting bracket, and at the time of implementing the telescope function, the lower tube 203 serves as a guide to make the upper tube 205 slide in the direction of the steering shaft 175 along the lower tube 203.

The hollow upper tube 205 is configured to be fitted on the lower tube 203 in the direction of the steering shaft 175 fixed to the vehicle body by the lower mounting bracket, and is formed with the first slot 207 and the second slot 209 at its end where the lower tube 203 is fitted. Therefore, the upper tube 205 can be contracted or relaxed either in the circumferential direction or in the diametrical direction at the time of implementing the tilt or telescope operation.

The first slot 207 is formed by slitting the upper tube 205 in the axial direction of the upper tube 205, and the second slot 209 is formed in the circumferential direction at the lower end of the first slot 207.

The supporting parts 211 are formed at the upper side of the second slot 209 to protrude from the outer periphery of the upper tube 205 and to be diametrically opposed to each other. For the telescope operation, the supporting parts 211 are formed at the circumferentially opposite sides of the first slot 207 to be symmetric to each other so as to support the contracting movement of the upper tube 205 when the adjusting lever 235 is tightened.

Specifically, the supporting parts 211 have a predetermined thickness and are formed to extend in the direction of the steering shaft 175 on the outer periphery of the upper tube 205 and to be diametrically opposed to each other at the opposite sides with reference to the first slot 207, so that the supporting parts 211 may contract the first slot 207 at the opposite sides of the first slot 207. The first slot 207 is formed as an elongated hole slit in the direction of the steering shaft 175.

In addition, for the telescope operation, the supporting parts 211 are respectively formed with the telescope operation holes 211a that extend in the direction of the steering shaft 175, so that the tilt bolt 230 extends through the telescope operation holes 211a to allow the upper tube 205 to be slid at the time of implementing the telescope operation.

Specifically, in order for the supporting parts 211 to readily contract the upper tube 205 to compress the lower tube 203 when the driver releases the adjusting lever 235 to set the steering column 200 to be suitable for the driver, and then tightens again the adjusting lever 235, the supporting parts 211 are formed to protrude from the outer periphery of the upper tube 205 and to be diametrically opposed to each other.

To the supporting parts 211, the tilt bracket 220 is coupled at the outer opposite sides of the supporting parts 211, and the supporting parts 211 are restrained by the tilt bolt 230 extending through the tilt bracket 220 and the telescope operation holes 211a and the adjusting lever 235 in such a manner that when the adjusting lever 235 is operated, the supporting parts 211 are contracted or relaxed either circumferentially or diametrically to enable the tilt or telescope function.

In addition, the stress dispersion part 213 is provided on the outer periphery of the upper tube 205 at the axially upper side of the supporting parts 211 to disperse stresses when the upper tube 205 is contracted or relaxed. Therefore, the stress dispersion part 213 allows the torsional loads, which are produced in the steering column 200 when the steering wheel is operated by the driver, to be dispersed while supplementing the rigidity of the upper tube 205. Consequently, the rigidity of the entirety of the steering column 200 will be increased.

Specifically, the supporting parts 211 of the upper tube 205 are fixed to the vehicle body via the tilt bracket 220 and the upper mounting bracket 225. Therefore, when the driver operates the steering wheel, torsional loads are intensely produced at the upper and lower ends of the first slot 207 due to the contraction and relaxation movements of the supporting parts 211. However, since the stress dispersion part 213 is provided, the torsional loads are evenly dispersed and absorbed over the outer periphery of the upper tube 205.

In addition, the second slot 209 formed by slitting the upper tube 205 in the circumferential direction is provided at a boundary area between the outer periphery of the upper tube 205 and the lower ends of the supporting parts 211. Therefore, when torsional loads are transmitted to the steering column 200 or the adjusting lever 235 is operated for the tilt or telescope operation, the transmitted loads are prevented from being concentrated to a part of the steering column 200, and the distribution of the operating force of the adjusting lever 235 is uniformized.

That is, since the operation force of the adjusting lever 235 is uniformly produced, which in the prior art, has been largely variably produced depending on the position of the tilt bolt 230 in the telescope operation holes 211a at the time of telescope operation, convenient and reliable feelings are provided to the driver.

The second slot 209 also facilitates the circumferential or diametrical contraction of the supporting parts 211 when the adjusting lever 235 is tightened. Further, the first slot 207 and the second slot 209 are formed to communicate with each other and the lower end of the first slot 207 is formed to communicate with the center of the second slot 209, so as to further facilitate the contraction and relaxation movements of the supporting parts 211.

It is possible to provide one or more stress dispersion parts 213 on the outer periphery of the upper tube 205 at the upper side of the supporting parts 211. In which case, as illustrated in FIGS. 2 and 4, the stress dispersion parts 213 may be formed to communicate with the first slot 207 and to extend in the circumferential direction, and may be formed at the circumferentially opposite sides of the first slot 207 to be symmetrical to each other.

In addition, the stress dispersion parts 213 may be formed at the boundary area between the upper ends of the supporting parts 211 and the outer periphery of the upper tube 205. If the stress dispersion parts 213 are formed at an area where the outer periphery of the upper tube 205 borders the upper ends of the supporting parts 211, the stress dispersion parts 213 and the second slot 209 are provided at the upper side and lower side of the supporting parts 211, respectively. As a result, the circumferential or diametrical contraction and relaxation movements of the supporting parts 211 can be further facilitated, and the distribution of the operation force of the adjusting lever 235 can be uniformized. Furthermore, the torsional loads intensely produced at the upper side and lower ends of the first slot 207 can be uniformly dispersed.

As illustrated in FIG. 5, the stress dispersion parts 213 may be formed by through-holes to be axially or diametrically spaced from the first slot 207, for example, adjacent to the upper end of the first slot 207.

In addition, the stress dispersion parts 213 may be formed at positions which form a predetermined angle from the upper end of the first slot in relation to the upper side axial direction, for example in the range of about 20° to 80°.

The stress dispersion parts 213, each of which is formed in a through-hole shape, may be formed at circumferentially opposed and symmetric positions with reference to the first slot 207 so that the torsional load intensely produced at the upper end of the first slot 207 can be further evenly dispersed and absorbed.

Referring to FIG. 1, such a steering column 200 may constitute a steering apparatus for a vehicle that includes a steering shaft 175 connected to a steering wheel, and a steering column 200 in accordance with an exemplary embodiment of the present invention which is coupled to the steering shaft 175 and assembled to a vehicle body.

Since the steering column 200 has been described in detail above, it will not be further described below.

In accordance with the inventive steering column for a vehicle and a steering apparatus having the same which are configured as described above, it is possible to prevent loads transmitted to the steering column from being concentrated to a part of the steering column, to uniformize the distribution of operation force of the adjusting lever, and to increase the rigidity of the entirety of the steering column while maintaining the bearing forces of the upper tube and the lower tube at the time of tightening and releasing the adjusting lever for a tilt or telescope operation, so that the steering column can be prevented from being deformed or damaged when a driver operates a steering wheel.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A steering column for a vehicle comprising:
    a hollow lower tube enclosing a steering shaft; and
    an upper tube fitted on an outer periphery of the lower tube,
    wherein the upper tube includes: a first portion on which a first slot is slit axially; a second slot is slit circumferentially at the lower end of the first slot; supporting parts protrude from an outer periphery of the first portion at an upper side of the second slot to be diametrically opposed to each other; one or more stress dispersion parts are formed on the outer periphery of the first portion at an axially upper side of the supporting parts to disperse stresses; and a second portion on which an upper tube hole is formed,
    wherein the first portion protrudes upwardly from an outer periphery of the second portion so that the first portion has an outer circumference greater than that of the second portion,
    wherein the supporting parts are formed at circumferentially opposite sides of the first slot on the first portion of the upper tube, and
    wherein the one or more stress dispersion parts are formed by a through-hole spaced from the first slot by a predetermined distance between the first slot and the upper tube hole.

2. The steering column as claimed in claim 1, wherein the one or more stress dispersion parts are formed at a position forming a predetermined angle from the upper end of the first slot in relation to the upper side axial direction.

3. The steering column as claimed in claim 2, wherein the one or more stress dispersion parts are formed at circumferentially opposed and symmetric positions with reference to the first slot.

* * * * *